United States Patent Office 2,958,031
Patented Oct. 25, 1960

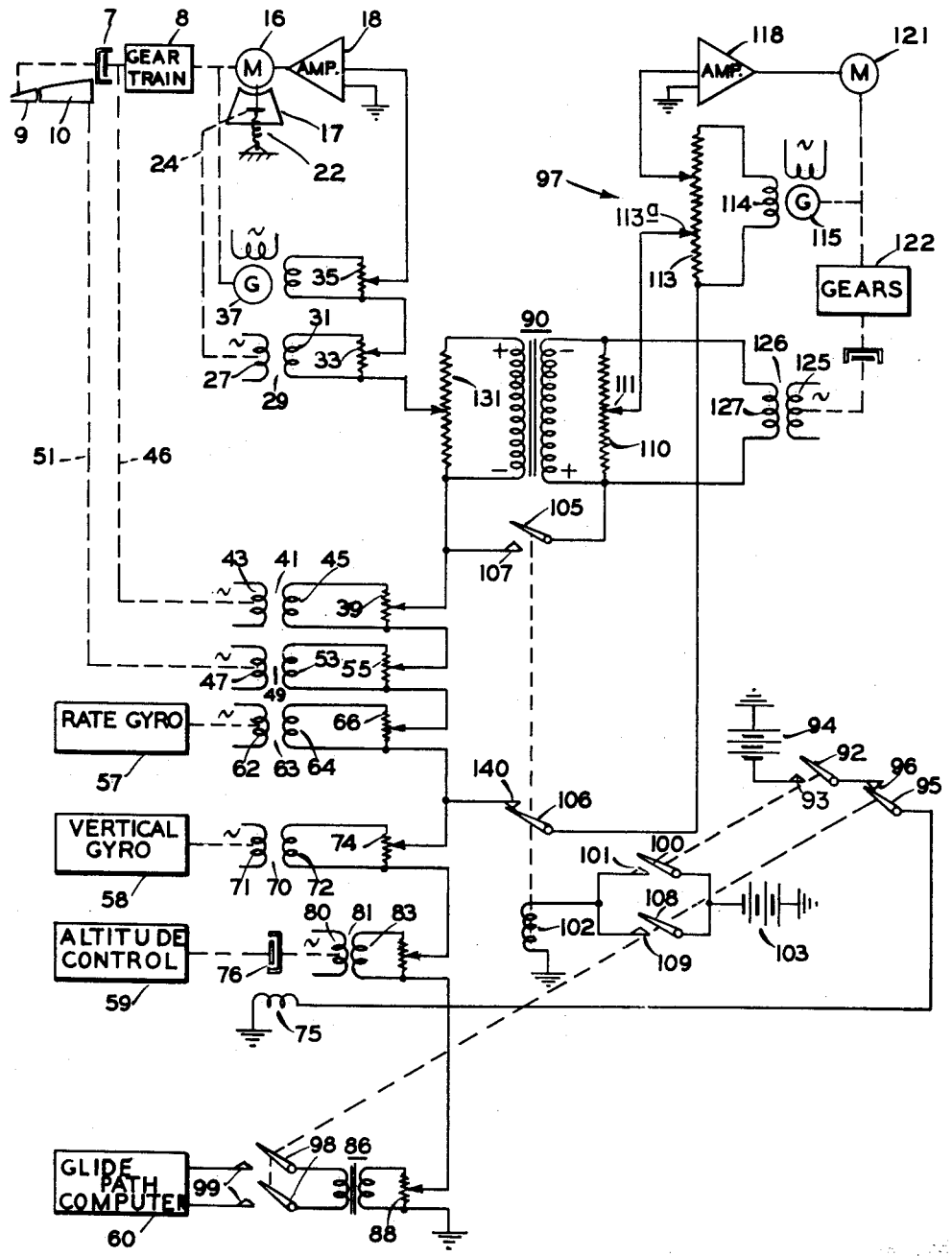

2,958,031

CONTROL SYSTEM

John E. Taylor, New Milford, N.J., and Ralph J. W. Sellite, New York, N.Y., assignors to The Bendix Corporation, a corporation of Delaware Filed Nov. 30, 1955, Ser. No. 550,093

8 Claims. (Cl. 318—489)

This invention relates generally to control systems for aircraft.

The linkage for the control surface of an aircraft has a certain amount of static friction which must be overcome by the servomotor or power means of the control system before the control surface of the craft can be moved. A signal of substantial magnitude must be developed, therefore, to operate the servomotor. Thus, when an automatic control system is to maintain a craft at a constant attitude, a balanced condition may result in the control system while the aircraft is displaced from the reference attitude; and when the system is to maintain the craft at a constant absolute reference, such as altitude, a slow oscillation of the craft about the reference may result due to the fact that a substantial deviation from the reference must exist before servomotor operation occurs. Thereafter, the servomotor operation displaces the surface a considerable extent; and the craft rapidly approaches and overshoots the reference, and oscillation results from the correcting for the overshooting.

An object of the present invention therefore is to provide a novel means for maintaining a craft in its reference condition despite the static friction existing in the system.

Another object is to provide a novel control system for selectively maintaining a craft in a reference attitude or on an absolute reference condition wherein the system includes a circuit operable as an integrator and as a lag circuit, the latter providing a signal corresponding to the signal applied to the circuit but whose envelope phase lags the phase of the applied signal as determined by the time lag of the circuit.

Another object is to provide an automatic control system with a circuit selectively operable as a lag circuit and as an integrating circuit.

The present invention contemplates a novel control system having means for detecting deviation from reference condition and applying an action to correct for the deviation provided with means for selectively developing a further correction corresponding either to the integral of the deviation detected or to a lagging reproduction of the detected deviation.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description, and is not to be construed as defining the limits of the invention.

The single sheet of drawing illustrates schematically an embodiment of the present invention incorporated in the pitch control channel of an automatic control system for aircraft.

In the drawing, a suitable clutch 7 and gear train 8 connect the control tab 9 of an elevator surface 10 to a two-phase induction type servomotor 16 which may be journaled in a cradle 17 as described in copending application Serial No. 502,936, assigned to the assignee of the present invention. A servoamplifier 18 operates this servomotor in response to a signal input from a plurality of signal sources connected to form a signal chain. Amplifier 18 may be of a conventional discriminator type which raises the signal to a sufficient level to operate motor 16 in a clockwise or counterclockwise direction dependent upon the phase of the input signal. As motor 16 tends to turn in cradle 17 when it applies a torque to tab 9, the turning is resisted by resilient means, such as springs 22 so that the extent of turning corresponds to the torque exerted on the surface. Through a suitable mechanical connection 24, the turning of motor 16 in cradle 17 displaces the rotor 27 of an inductive device 29 relative to stator 31 to develop across potentiometer 33 a signal corresponding in phase and amplitude to the direction and amount of torque.

The signal from potentiometer 33 is connected in a degenerative fashion to the input of amplifier 18 along with the signal across potentiometer 35, the latter signal being derived from a conventional rate generator 37 which develops a signal corresponding in phase and amplitude to the direction and rate of operation of motor 16 to damp the motor operation. Further connected degeneratively to the input of amplifier 18 is the signal across potentiometer 39 derived from inductive device 41 whose rotor 43 is displaced relative to stator 45 by way of a suitable mechanical connection 46 extending from the output shaft of gear train 8. The operation of motor 16 in response to an input signal to amplifier 18 displaces rotor 43 to develop across potentiometer 39 a signal having a phase and an amplitude corresponding to the direction and extent of motor operation for reducing the net input signal to amplifier 18 to zero.

When clutch 7 is engaged, the operation of motor 16 also displaces control tab 9 of the elevator surface 10, and the tab displacement exerts an aerodynamic effect on the main surface 10 to displace this surface. In order that the extent of surface displacement will correspond to the amplitude of the input signal operating motor 16, the rotor 47 of inductive device 49 is connected by way of a suitable mechanical connection 51 to surface 10 for displacement relative to stator 53 to develop across potentiometer 55 a signal corresponding in phase and amplitude to the direction and extent of surface displacement.

The condition of the craft with respect to predetermined conditions are sensed by a rate gyroscope 57, a vertical gyroscope 58, an altitude control 59 and a glide path computer 60.

As a displacement of surface 10 causes the craft to turn about its axis, the conventional spring loaded rate gyro 57 responds to the rate of turning and, in a well known manner, displaces the rotor 62 of an inductive device 63 relative to its stator 64 to develop across potentiometer 66 a signal corresponding in phase and amplitude to the direction and rate of turning. This signal operates motor 16 to damp the movement of the craft so as to help prevent the craft from drifting beyond the desired condition due to the inertia of the craft.

Vertical gyro 58 may be of a conventional type having an inductive device 70 connected to the pitch axis trunnion of the gyro so that the deviation of the craft from a predetermined pitch attitude displaces rotor 71 relative to stator 72 to develop across potentiometer 74 a signal corresponding in phase and amplitude to the direction and extent of the deviation.

Altitude control 59 may be of the type disclosed in Patent No. 2,512,902, issued to Rossire on June 27, 1950. When coil 75 is energized, the magnetic clutch 76 is engaged. Thereafter, displacement of the craft from this altitude displaces the rotor 80 of an inductive device 81 relative to its stator 83 to develop at potentiometer 85 a signal corresponding in phase and amplitude to the direction and extent of displacement of the craft from the altitude at which clutch 76 was engaged.

Glide path control 60 may be of a conventional type which, in response to deviation of the craft from the glide path, develops a signal output corresponding in amplitude and phase to the extent and direction of the displacement. By way of coupling transformer 86, this signal is applied across potentiometer 88 to operate motor 16 to return the craft to the glide path.

An interlock provides for the selective engagement of altitude control 59 and glide path control 60. Thus, the closing of switch arm 92 energizes coil 75 from battery 94 provided that switch arm 95 is engaged with contact 96; and, if switch arm 92 be in engagement with contact 93, the engagement of switches 98 to place the glide path control into operation, disengages armature 95 from contact 96 and the altitude control is rendered inoperative.

In accordance with the present invention, a novel circuit generally designated 97 is operated selectively as a lag circuit or as an integrator from armatures 105 and 106. Upon the closing of switch 92 to engage altitude control 59, switch arm 100 is engaged with contact 101 energizing solenoid operated relay 102 from battery 103, and the solenoid pulls its armatures 105 and 106 downwardly from the position shown so that circuit 97 operates as a lag circuit. Solenoid 102 is likewise energized when siwtches 98 are engaged with contacts 99 to engage the glide path control 60, the circuit to the solenoid being completed by way of armature 108 and contact 109.

The engagement of armature 105 with contact 107 sends a signal to a voltage divider formed by potentiometer 110 of circuit 97 whose wiper 111 is connected to a potentiometer 113 which is connected across the output winding 114 of a conventional rate generator 115. The combined signal from potentiometer 113 is applied to a conventional discriminator type amplifier 118 to operate motor 121.

Motor 121 actuates rate generator 115 to develop at winding 114 a signal corresponding in amplitude and phase to the rate and direction of motor operation. This signal is fed back degeneratively to the motor across potentiometer 113 so that the rate of motor operation corresponds to the amplitude of the input signal. Through a gear train 122 the motor also displaces the rotor 125 of an inductive device 126 relative to a stator 127 to develop a further signal across voltage divider 110. When this signal at wiper 111 of voltage divider 110 becomes equal and opposite to the signal applied from armature 105 to the voltage divider, the net input to amplifier 118 is zero and operation of motor 121 is stopped.

The signal across stator 127 is also applied by way of coupling transformer 90 to a potentiometer 131. This signal is so connected into the signal chain to amplifier 18 to add to the error signal to provide for greater correction for the existing error.

The signal across potentiometer 131 may have the same envelope shape as the signal applied to circuit 97 from armature 105, but the envelope phase of the signal across potentiometer 131 lags the signal from armature 105.

As explained above, the voltage across potentiometer 113 determines the speed of motor 121 and the rate at which rotor 125 of inductive device 126 rotates relative to stator 127 and the adjustment of wiper 113a determines, in part, the time lag of the lag circuit. The time lag of the circuit also is changed by adjusting wiper 111 on potentiometer 110. This latter adjustment also affects the amplitude of the lag signal across inductive device 126.

When switch arms 92 and 95 are in the position shown, armatures 100 and 108 are also in the positions shown. Solenoid operated relay 102 is deenergized, and armatures 105 and 106 are moved to the position shown so that circuit 97 operates as an integrator. At this time the signal from contact 140 is applied by way of armature 106 and potentiometer 113 to amplifier 118 to operate motor 121 to displace rotor 125 and develop a signal which is coupled across transformer 90 to potentiometer 131.

Due to rate generator 115, motor 121 operates at a rate corresponding to the amplitude and phase of the signal at contact 140 and continues to operate as long as a signal is present at contact 140. Thus, the signal at inductive device 126 is a signal corresponding to the integral of the signal at contact 140 and applies to amplifier 18 a signal in addition to the signal at contact 140.

When circuit 97 operates as a lag circuit, inductive device 126 provides a displacement follow-up signal which opposes the input to circuit 97 from armature 105, and motor 121 stops when the signal from inductive device 126 across the portion of potentiometer 110 at wiper 111 equals the signal from armature 105. This occurs when the signal from armature 105 attains a steady state condition.

When circuit 97 operates as an integrator, rate generator 115 provides a rate follow-up signal which opposes the input to circuit 97 from armature 106 and motor 121 continues to operate as long as a signal is present at armature 106. The manner of applying the signals from armatures 105 and 106 to circuit 97 determines the mode of operation of circuit 97 as a lag or integrating circuit so that inductive device 126 provides either a lag or integral signal.

Assuming now that the craft is flying in a level attitude with switches 92 and 98 in the open positions shown and the elevator 10 in a streamlined position, the signal chain is balanced so that the input signal to amplifier 18 is null. Thereafter, a displacement in pitch, such as a nose up or nose down attitude, displaces rotor 71 relative to stator 72 to develop a pitch signal whose amplitude and phase correspond to the extent and direction of displacement. The signal is amplified and discriminated as to phase in amplifier 18 to provide an amplifier output to operate motor 16 in a direction to displace tab 9 so as to displace surface 10 to return the craft to a level attitude.

Motor 16 displaces tab 9 and the aerodynamic action of the tab displaces surface 10 until the resulting displacement of rotor 43 of inductive device 41 and rotor 47 of inductive device 49 builds up a combination signal to equal and oppose the attitude error signal from inductive device 70. At this time, the net input to the motor stops. As the displaced surfaces return the craft to reference, the attitude error signal diminishes and the excess signal due to the signals from inductive devices 41 and 49 operates motor 16 to return the surfaces to a streamlined position.

Should a change in the location of the center of gravity occur, due to fuel consumption or change in position of the cargo, a permanent correction of the elevator surface may be required to keep the craft in a level attitude. An error signal at inductive device 70 develops to operate motor 16 in a direction to return the craft to level flight and until this error signal is balanced by the error signal from inductive devices 41 and 49 due to the displaced surface. The error signal is also applied by way of contact 140 and armature 106 to amplifier 118 which operates motor 121 to displace rotor 125 of inductive device 126 relative to stator 127; rate generator 115 feeding back a signal degeneratively to amplifier 118 to make the rate of motor operation correspond to the amplitude of the signal at contact 140. Thus, the signal developed across potentiometer 131 corresponds to the integral of the error signal at contact 140.

It is to be noted, however, that when the signal at contact 140 is varying rapidly, the integration output is slight because of the output characteristics of generator 115 and the inability of the motor system to respond rapidly. The output at potentiometer 131 in response to a sustained signal builds up to balance the signal from inductive devices 49 and 41 as the craft returns to the level attitude condition and the signal from inductive device 70 drops to null. Thus, the craft is returned to level attitude with the new surface and tab position necessary to maintain this attitude.

Upon the closing of switch 92, switch 100 is closed and coil 75 of clutch 76 is energized and solenoid 102 is energized. The engagement of clutch 76 drivably connects altitude responsive device 59 and inductive device 81 so that any departure of the craft from the altitude of the craft at the time of engagement develops a corresponding signal. The energization of solenoid 102 disengages contact 140 from armature 106 and engages contact 107 and armature 105 to convert circuit 97 from an integrator circuit to a lag circuit.

As explained before, the static friction which exists in the elevator linkage must be overcome before the servomotor operates to displace the surface. To produce an error signal of sufficient magnitude to operate servomotor 16 against the aerodynamic moment on the elevator surfaces and static friction of the linkages, the craft departure from the reference altitude must become relatively large. The large signal then operates servomotor 16 to cause the elevators to be displaced a considerable amount and cause a relatively large change in pitch attitude. The combination of the resulting rapid approach of the craft to the reference altitude and the static friction usually results in the craft overshooting the reference altitude which is then followed by slow oscillations of the aircraft about the reference altitude.

Since the basic cause of this oscillation condition is the large altitude error required to overcome the static friction, increasing the output of amplifier 18 for a given input signal would overcome the effect of the static friction. However, it would also tend to cause over control of the surface on a short time basis and result in high frequency oscillations of the elevator. In accordance with the present invention, the output of the amplifier for a given error signal is increased on a long-term, average basis in order to eliminate the oscillation of the craft without causing high frequency oscillations of the surface at the same time.

Closing switch 92 to place the craft under constant altitude control, therefore, disengages armature 106 from contact 140, engages armature 105 with contact 107, and changes the circuit 97 from an integrator into a lag circuit which provides a signal corresponding to a function of the summation of the individual altitude displacement, attitude displacement, surface position and servomotor position signals.

When an altitude displacement occurs, the altitude error voltage developed at inductive device 81 is applied to both servo amplifier 18 and circuit amplifier 118. Circuit 97 starts to build up a "lagging" altitude error voltage, that is, a voltage whose envelope corresponds to the altitude error voltage but whose envelope phase lags the phase of the altitude error voltage, and the sum of the altitude error voltage and the "lagging" error voltage becomes large enough to cause the elevator servomotor 16 to overcome the static friction and displace the elevator surface before a large altitude displacement occurs. The operation of the servomotor by the altitude and lagging signals is opposed by the servomotor position and surface position follow-up signals from inductive devices 41 and 49 which signals oppose changes in surface positions; and as the displaced surface changes the pitch attitude to start the craft toward a return to the reference altitude, the pitch attitude signal from inductive device 70 is opposed by the pitch rate signal from inductive device 63 which opposes a rate of change of attitude.

After an interval of time, the "lagging" pitch error signal and the "lagging" servomotor and surface followup signals also start to build up. As the craft approaches the reference altitude, both the altitude displacement and the "lagging" altitude error signal diminish.

The signal summation which originally provided the altitude correction is reduced and the sum of the follow-up and attitude signals operate servomotor 16 to return the elevator surface to streamline position. As the altitude error and "lagging" altitude signals diminish, the sum of the pitch attitude and the "lagging" pitch attitude signals prevails to displace the surface in a direction to level the aircraft and are opposed by the follow-up signals which again oppose the displacement of the elevators. As the aircraft levels off, the altitude and attitude displacement signals diminish; the "lagging" altitude and pitch signals also diminish but lag behind the actual closure to the reference altitude and pitch attitude; and the follow-up signals tend to return the elevators toward normal position. As the aircraft reaches the reference altitude, the altitude displacement signal diminishes to null but the "lagging" altitude error signal and the opposing "lagging" attitude signal still persist; and if the "lagging" altitude error signal is larger, the aircraft is slightly displaced from level flight and an overshoot results. The combination of the altitude error signal, resulting from the overshoot, and the pitch attitude signal, resulting from the displacement from level flight, however, provides a sufficient signal to apply a corrective elevator action to bring the craft to reference altitude, with minimum oscillation, and with the elevators streamlined and all signals reduced to null.

The signal value of the various sensors and the time constant of the lag circuit are adjusted by positioning the wipers on the various potentiometers so that the pitch attitude signal starts leveling off the aircraft soon enough to prevent substantial overshoot of the reference altitude. The time constant of the lag circuit is made long enough to return the aircraft to the reference altitude, after the overshoot, before a "lagging" signal can be developed with sufficient magnitude to cause oscillation, and also to prevent response of the lag circuit to short-duration or transient errors.

The glide path control 60, when switches 98 engage contacts 99, provides a signal in response to deviation of the glide path. This signal is applied through the lag network 97 to operate the elevator in the same manner as the altitude signal discussed above.

The foregoing has presented a novel control system which selectively either maintains a craft at a predetermined attitude by integration of the steady state condition error to control the craft to reduce the error to zero or maintains a craft on a predetermined reference by providing an additional signal for sustained deviations from the reference to aid in returning the craft to reference.

Although but one embodiment of the invention has been illustrated and described, various changes can be made in the design and arrangement of the parts without departing from the spirit and scope of the invention, as the same will now be understood by those skilled in the art.

We claim:

1. An aircraft control system comprising power means for operating a control surface of a craft, means for detecting deviations of said craft from a predetermined attitude for developing a corresponding deviation signal, further means responsive to said signal for developing a further signal corresponding to the integral of said deviation signal, means combining said signals to operate said power means to correct for said deviation, additional means adapted to be operated in response to deviation of said craft from a predetermined reference for developing a reference error signal for said power means, and means rendering said additional means operable and simultaneously changing the operation of said further means to provide a lagging reproduction of said deviation and error signals.

2. An aircraft control system comprising first means for developing a signal corresponding to the error in attitude of an aircraft with respect to a predetermined attitude, second means capable of being selectively rendered effective and ineffective for developing a signal corresponding to the error in altitude of a craft from a predetermined altitude, power means under control of said signals for correcting for said error, third means responsive to said signals and operable as an integrator or lag device for developing a further signal, selection means for rendering said second means effective and ineffective, and means operable by said selection means for operating said third means so that said further signal is an integral signal when said second means is rendered ineffective and said further signal a lagging reproduction of said attitude and altitude error signals when said second means is rendered effective.

3. An aircraft control system comprising power means for operating a craft control member, first means providing a first control effect for operating said power means in response to deviation of the craft from a first predetermined condition, second means providing a second control effect for operating said power means in response to deviation of the craft from a second predetermined condition, and third means providing a third control effect for operating said power means in response to the magnitude and length of time duration of said first control effect when said craft is to be maintained in said first predetermined condition and for operating said power means in response to a lagging reproduction of said first and second control effects when said craft is to be maintained in said second predetermined condition.

4. A craft control system comprising power means for operating a control surface of said craft, control means for said power means including a plurality of signal means, attitude means responsive to deviation of the craft from a predetermined attitude for actuating one of said signal means to develop an attitude error signal, reference means responsive to deviation of the craft from a predetermined reference and selectively effective and ineffective for actuating a second of said signal means to develop a reference error signal, and means for actuating a third of said signal means to develop a signal corresponding to the integral of said attitude error signal when said reference means is ineffective and to produce a signal corresponding to a delayed reproduction of said attitude and reference error signals when said reference means is effective.

5. A craft control system comprising power means for operating a control surface of said craft, control means for said power means including a plurality of signal generators, attitude means responsive to deviation of the craft from a predetermined attitude for actuating one of said signal means to develop a corresponding attitude error signal, reference means responsive to deviation of the craft from a predetermined reference, selective means for rendering said reference means effective and ineffective on a second of said signal means to produce a reference error signal, and means including a motor and means connected with said selective means and said motor for operating said motor and a third of said signal means for actuating said third signal means as an integrator when said reference means is ineffective and as a slow signal reproducer when said reference means is effective.

6. A control system comprising means for developing an error signal corresponding to the deviation in value of a condition from a predetermined value, means responsive to said signal for selectively developing a further signal corresponding substantially to an integral of said error signal or to a lagging reproduction of said error signal, means for selectively actuating said last named means, and means under the control of said signals for correcting said deviation.

7. A control system for a craft comprising power means for operating a control surface of the craft, control means for said power means including a plurality of signal means, attitude means responsive to deviation of the craft from a predetermined attitude for actuating one of said signal means, reference means responsive to deviation of the craft from a predetermined reference, means selectively rendering said reference means capable and incapable of actuating a second of said signal means, means capable of actuating a third of said signal means as a lag circuit when said reference means is capable of actuating said second signal means and as an integrator when said reference means is not capable of actuating said second signal means.

8. A control system for a craft comprising power means for operating a control surface of the craft, control means for the power means including a plurality of signal means, attitude means for actuating one of the signal means for developing an attitude signal, an altitude reference and a radio reference for actuating other of the signal means, interlocking means for selectively rendering one or the other of the reference means effective on the signal means to produce a reference signal and for simultaneously rendering both said reference means ineffective on said reference means, and means for selectively operating another of said signal means as an integrator responsive to attitude signals when neither said altitude or radio reference is effective on said signal means and as a lag device responsive to attitude signals and to reference signals when said interlocking means is operated to render said altitude or radio reference effective on the associated signal means.

References Cited in the file of this patent
UNITED STATES PATENTS

| | | |
|---|---|---|
| 2,594,326 | MacCallum | Apr. 29, 1952 |
| 2,668,264 | Williams | Feb. 2, 1954 |
| 2,759,137 | Kutzler | Aug. 14, 1956 |
| 2,759,689 | Owen | Aug. 21, 1956 |